Jan. 8, 1935.  K. OMSTED  1,987,414
APPARATUS FOR PRESSURE COOKING AND SUBSEQUENT
COOLING OF HERMETICALLY SEALED CANS
Filed Nov. 11, 1932  2 Sheets-Sheet 2
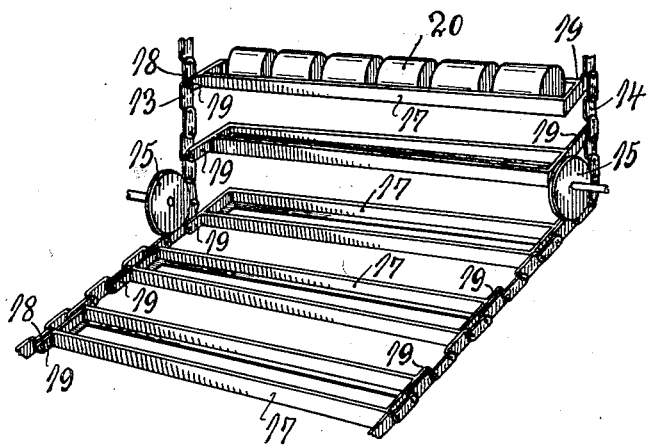
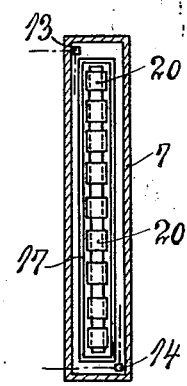
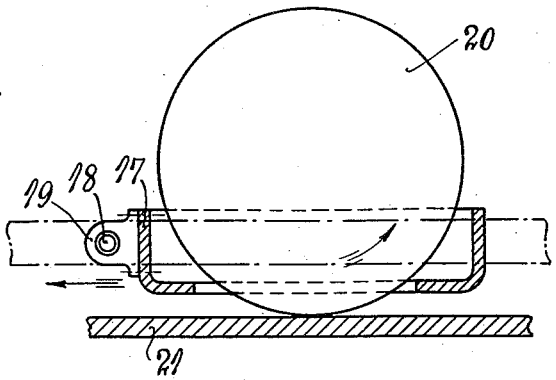
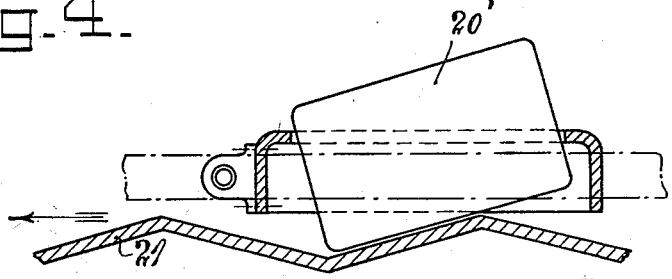
KAARE OMSTED
INVENTOR
BY Haseltine, Lake & Co.
ATTORNEYS Patented Jan. 8, 1935

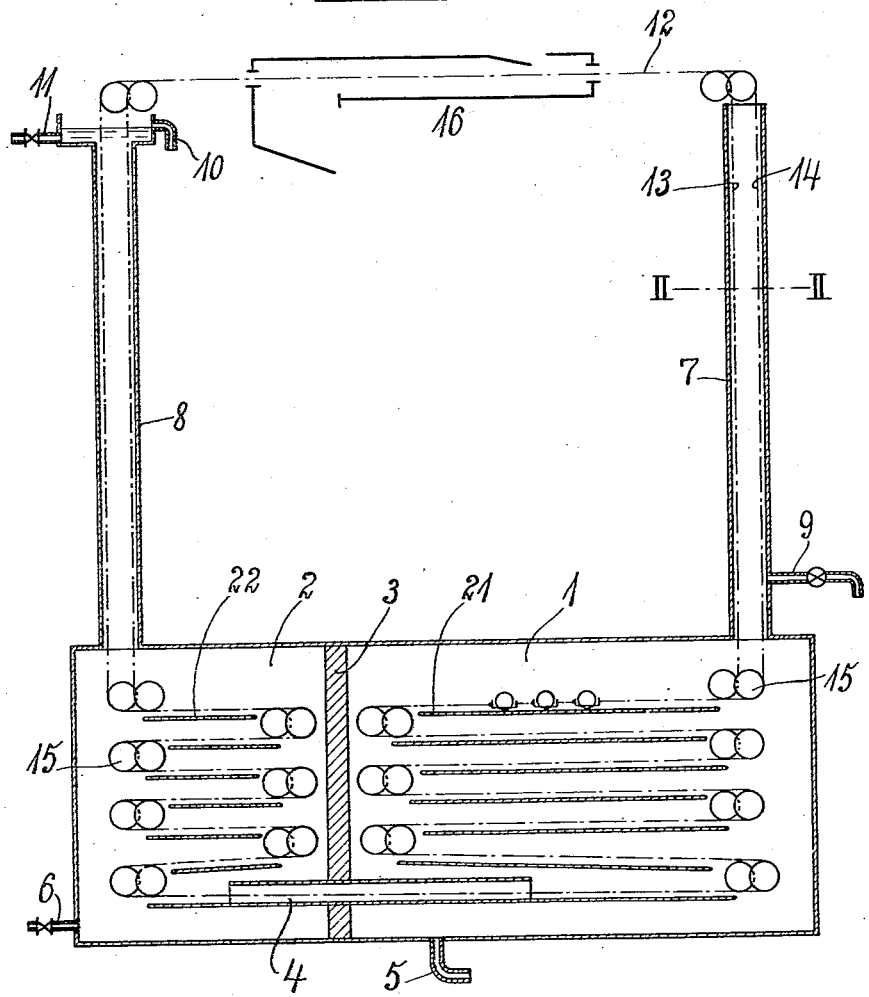

1,987,414

UNITED STATES PATENT OFFICE 1,987,414

APPARATUS FOR PRESSURE COOKING AND SUBSEQUENT COOLING OF HERMETICALLY SEALED CANS

Kaare Omsted, Oslo, Norway

Application November 11, 1932, Serial No. 642,207
In Norway November 13, 1931

7 Claims. (Cl. 126—272)

The present invention relates to improvements in apparatus for pressure cooking and subsequent cooling of hermetically sealed cans of any kind. The apparatus according to the present invention is of the type where the cans are being moved in a continuous path through a liquid heating medium, and thereafter in order to be cooled through a liquid cooling medium.

The main object of the present invention is to provide improvements in this type of apparatus in such a way that the heating of the cans and the cooling of same can be done in a continuous process, contrary to the previously known methods according to which it has been common first to heat the cans in a boiler and thereafter to move the cans over to a cooling receptacle, preferably also filled with a liquid.

According to the present invention, however, the cans are arranged on a continuously moving transporting belt, which first passes through a receptacle filled with a hot liquid and thereafter preferably through a narrow path into a receptacle with a cooling liquid, wherefrom the cans on the same belt are moved out and discharged into a suitable place outside the apparatus.

A further object of this invention is to provide means, whereby the pressure of the liquid in the receptacles can be maintained at a suitable value to obtain a suitable temperature for the heating of the cans, at the same time as the cans freely can be passed into and out from the receptacles. For this purpose, the heating receptacle as well as the cooling receptacle is provided with upwardly extending chimneys, which are open at the upper end, said transporting belt being arranged to pass through each of said chimneys. This is a most suitable arrangement as the cans, as they move down slowly will be heated up.

Further objects and novel features of this invention will be obvious from the following description of a preferred embodiment of the invention with reference to the appended drawings, diagrammatically illustrating an apparatus according to this invention.

In the drawing, Fig. 1 is a diagrammatical cross section of a complete apparatus according to this invention.

Fig. 2 is a transverse cross section on the line II—II of Fig. 1.

Fig. 3 illustrates to a larger scale a detail of the endless chain of the invention, and Fig. 4 illustrates a modification of Fig. 3 to the same scale. Fig. 5 is a fragmentary perspective view of the chain on a considerably enlarged scale.

With reference to the drawings, 1 denotes a receptacle filled with a liquid of high temperature and 2 a receptacle filled with a liquid of low temperature. The receptacles 1 and 2 are in the embodiment shown separated from each other by a partition wall 3, preferably of heat insulating material. Between the receptacle 1 and the receptacle 2, a narrow low path or channel 4 is arranged. The width of this channel preferably corresponds to the width of the receptacles 1 and 2, and the height preferably corresponds to the height of the cans to be prepared. In order to maintain the liquid in the container 1 at a suitable temperature, a steam pipe 5 may be connected to the bottom of same.

Chimneylike towers 7 and 8 are arranged in connection with the upper part of the receptacles 1 and 2 and are open at the upper end. These chimneys have preferably the same width as the width of the receptacles 1 and 2. The chimney 7 which is in connection with the hot liquid receptacle 1 may be provided with a drainage outlet 9, through which the condensed steam may be taken out and sent back to the boiler (not shown), and the chimney 8 which is in connection with the cold liquid receptacle 2 is provided with an overflow pipe 10 to secure a constant head of water pressure in both receptacles. A cold liquid inlet 11 is also arranged at the top of the chimney 8. At the bottom of the receptacle 2 a drainage pipe 6 may be arranged to drain out liquid which will be heated, primarily due to the fact that the hot cans enter at the bottom of the receptacle 2, and secondarily due to the fact that a certain amount of hot liquid from the container 1 may pass into the receptacle 2.

An endless transporting belt 12, preferably consisting of two chains 13 and 14, is arranged to pass over a number of sprocket wheels 15 and in a path down through the chimney 7 in a zigzag path through the receptacle 1, further through the passage 4 into the receptacle 2, and here also in a zig-zag path through the same and out through the chimney 8 and further back to the chimney 7. Between the upper end of the chimney 8 and the chimney 7 a loading and discharging arrangement 16 for supplying cans to the transporting belt and for discharging the same from the belt is arranged. This loading and discharging arrangement forms no part of this invention and is therefore not described.

Turning now to Fig. 2, it will be observed that the chains 13 and 14 are arranged diagonally opposite in the rectangularly shaped chimney 7, and that a frame structure 17, preferably also of rectangular shape, is fastened to the said chains 13 and 14 by means of bolts or pins 18 passing into suitable eyes 19 in the frame 17. A plurality of these frames 17 are connected to the chains 13 and 14. The frames 17 are adapted to hold a number of cans 20 and to transport same through the apparatus.

By the arrangement above described with the opposite forward and rearward attachment of the frame 17 to the chains 13 and 14, it is made possible to move the same frames through the whole apparatus in a path, continuously changing in direction without tipping the said frame one way or the other, so that the cans 20 will rest in the same frames, when they pass down the chimneys or through the receptacles, due to the force of gravity.

In the receptacles 1 and 2, the chains 13 and 14 with the frames 17 are preferably arranged to move in a zig-zag path. In order that the frames 17 shall not tip or turn where the chains change their direction of movement, the sprocket wheels 15 for the chain 13 and for the chain 14 are arranged staggered in relation to each other, which will appear in Fig. 1.

When the cans pass through the hot or the cold liquid it is preferable that each can shall be kept in a constant movement about itself. This is according to the invention obtained by a very simple arrangement. As will be seen in Fig. 1, a number of tables or plates 21 and 22 are arranged in the receptacles 1 and 2, immediately underneath the path of the chains 13 and 14. When the cans are moved over these tables, they will rest against the tables as shown in Fig. 2 and will automatically be rolled about their own axes. Thereby the contents of the cans will be subjected to an even heating action. If the cans have other shape than round, so that the rolling action is impossible, the tables 21 may be substituted by a table 21' as shown in Fig. 4. These tables are given a wavelike form and the square or otherwise formed cans 20' will be subjected to a rocking movement.

It will of course be understood that even if the two receptacles 1 and 2 in the above described preferred embodiment of this invention have been shown as a unit with a partition wall 3, these two receptacles may be constructed as separate containers between which a conduit or channel 4 is arranged as a connection between the two.

By means of the apparatus above described, it will be understood that the complete process of pressure cooking and subsequent cooling of hermetically sealed cans will be done in a continuous process without loss of time and without the need of complicated machinery or extra hand labor.

I claim:

1. Apparatus for pressure cooking and subsequent cooling of hermetically sealed cans, including the combination of a hot liquid receptacle adapted to be completely filled with liquid and having a top opening for the entry of the cans to be treated, a receptacle for cooling liquid adapted to be completely filled with liquid and also having a top opening for the exit of said cans, an intermedite connection between said receptacles directly connecting one side of one receptacle horizontally with the corresponding side of the other receptacle so as to provide a direct horizontal passage from the interior of the one receptacle to the interior of the other, means to support and carry said cans into the hot liquid receptacle through the top opening therein and thence into the cooling liquid receptacle through said horizontal passage and finally upward and out from said cooling liquid receptacle through the top opening therein for discharge of the cans, and means for maintaining a constant hydrostatic pressure within both receptacles and said horizontal passage.

2. Apparatus for pressure cooking and subsequent cooling of hermetically sealed cans, including the combination of a hot liquid receptacle adapted to be completely filled with liquid and having a top opening for the entry of the cans to be treated, a receptacle for cooling liquid adapted to be completely filled with liquid and also having a top opening for the exit of said cans, an intermediate connection between said receptacles directly connecting one side of one receptacle horizontally with the corresponding side of the other receptacle so as to provide a direct horizontal passage from the interior of the one receptacle to the interior of the other, means to support and carry said cans into the hot liquid receptacle through the top opening therein and thence into the cooling liquid receptacle through said horizontal passage and finally upward and out from said cooling liquid receptacle through the top opening therein for discharge of the cans, and means for maintaining a constant hydrostatic pressure within both receptacles and said horizontal passage comprising a chimney or column directly surmounting the top opening of each of the two receptacles.

3. Apparatus according to claim 1, wherein the means for supporting and carrying the cans through the receptacles comprises a pair of endless chains which are spaced apart and pass practically in parallelism through the receptacles, the top openings and the intermediate passage and have can supporting frames disposed between the two chains and directly secured at the ends thereof to said chains.

4. Apparatus according to claim 1, wherein the means for supporting and carrying the cans through the receptacles comprises a pair of endless chains which are spaced apart and pass practically in parallelism through the receptacles, the top openings and the intermediate passage and have can supporting frames having open bottoms to partly expose the carried cans from below disposed between the two chains and directly secured at the ends thereof to said chains, and stationary means within said receptacles disposed beneath and in generally horizontally parallel arrangement with respect to generally horizontal sections of said chains to make contact with portions of the cans exposed through the open bottoms of said supporting frames and thereby cause axial rotation of the cans during transit through said receptacles.

5. Apparatus for pressure cooking and subsequent cooling of hermetically sealed cans comprising the combination of a receptacle for hot liquid adapted to be completely filled thereby, a receptacle adapted to be completely filled with cold liquid disposed laterally to said receptacle for hot liquid, a lateral passage connecting the two receptacles, a pair of vertically disposed hollow members individually surmounting the said receptacles, forming inlet and outlet passages and pressure regulating means, means to hold and transport hermetically sealed cans through the inlet passage into the hot liquid receptacle and through the lateral passage between the said receptacles into the cold liquid receptacle and from the latter through the outlet passage out of the apparatus, said means for transporting the said cans through the said receptacles consisting of substantially parallelly disposed endless chains and frames carried by said chains and adapted to hold the cans and to allow of their free movement about their axes, and a plurality of tables arranged within the receptacle for the hot liquid, said transporting chains being carried through said receptacle for the hot liquid in serpentine paths adjacent to said tables so that the cans will come into contact with the tables when passed through said receptacles, thereby causing the cans to rotate about their axes.

6. Apparatus according to claim 2 wherein the chimney associated with the hot liquid receptacle is adapted for receiving the cans, and the other chimney is adapted for discharging said cans, while each chimney has a sufficient height to provide the necessary pressure head in its associated receptacle when practically filled with liquid.

7. Apparatus according to claim 1 wherein the means for supporting and carrying the cans through the receptacles comprises a plurality of can supporting frames, a plurality of rotatable sprockets disposed within the receptacles and a plurality of similar sprockets also disposed above said receptacles, and a pair of endless chains which are spaced apart and pass practically in parallelism through the receptacles, through the top openings thereof and through the intermediate passage between the same, which can supporting frames are disposed between the two chains and directly secured at diagonally opposite corners of the frames to said chains, so that said frames will retain normal horizontal positions while being transported through all paths in all positions and about said sprockets.

KAARE OMSTED.